United States Patent Office 3,469,232
Patented Sept. 23, 1969

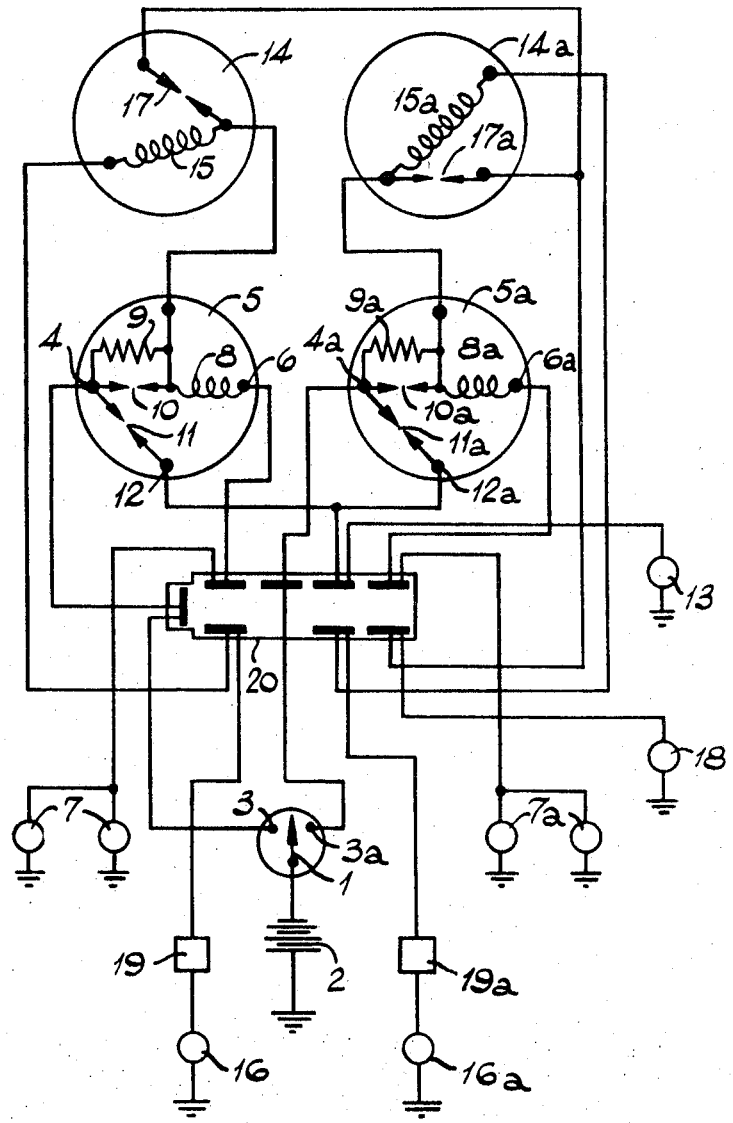

3,469,232
VEHICLE DIRECTION INDICATOR SYSTEMS
Alfred Donald Prickett, Birmingham, England, assignor to Joseph Lucas (Industries) Limited, Birmingham, England
Filed Mar. 14, 1966, Ser. No. 533,953
Int. Cl. B60q 1/34
U.S. Cl. 340—80                1 Claim

ABSTRACT OF THE DISCLOSURE

A vehicle direction indicator system including a flasher unit having a first terminal for connection to a source of electric supply, a second terminal for connection to a set of indicator lamps of a vehicle and a third terminal for connection to a pilot lamp. The flasher unit being provided with a fourth terminal for connection to a further set of indicator lamps which may optionally be brought into the circuit. The first terminal having an internal connection with the second terminal by way of a resistance wire and the coil of an electromagnet and the fourth terminal being connected to a point intermediate the resistance wire and the coil whereby the additional current flow to the fourth terminal will have substantially no effect on the frequency of operation of the flasher unit.

---

This invention relates to vehicle direction indicator systems of the flashing electric indicator lamp type, and of the kind incorporating a flasher unit comprising, in combination, a first terminal for connection to a source of electric supply, a second terminal for connection to a set of indicator lamps of the vehicle, an electromagnet having its coil connected between the first and second terminals, a resistance wire in series with the coil, a first armature operable by the electro-magnet to close a first pair of contacts, said first armature being restrained against movement by the electro-magnet by a portion of the resistance wire; said first pair of contacts when closed being arranged to bridge the resistance wire to allow a full flow of current to the indicator lamps, a third terminal for connection to a pilot lamp, a second armature operable by the electro-magnet when the current flowing through the coil thereof attains a predetermined value, a second pair of contacts operable by said second armature and arranged, when closed, to complete a circuit between the first and third terminals, the arrangement being such that, when the first terminal is connected to the source of supply, current flow through the resistance wire will cause it to expand and so permit the first armature to be moved by the electro-magnet to close the first pair of contacts whereupon the resistance wire will cool, and after a predetermined time, will move the armature to open the first pair of contacts and allow the cycle to be repeated.

With such systems it is not possible to connect further indicator lamps to the second terminal without upsetting the frequency of operation of the flasher unit. Moreover, the operation of the pilot lamp which by its failure to work indicates that one or more of the set of indicator lamps is inoperative, would be upset, and the object of this invention is to provide a direction indicator system of the kind specified to which additional indicator lamps on a trailer vehicle may be connected.

According to the invention a vehicle direction indicator system of the kind specified comprises a current relay including a further coil one end of which is connected to a point intermediate the resistance wire and coil of the flasher unit and the other end of which can be connected to an indicator lamp on the trailer vehicle, and a further pair of contacts operable by the coil for connecting a further pilot lamp with the source of supply.

The accompanying drawing is a circuit diagram of one example of a vehicle direction indicator system in accordance wtih the invention and in which there is provided a direction indicator control switch having a wiper contact 1 which is connected to a source of electric supply 2. The switch is provided with two operative positions and an intermediate non-operative position and in the operative positions one or the other of a pair of output terminals 3, 3a are connected to the wiper contact. Connected to the pair of output terminals are the first terminals 4, 4a of a pair of flasher units 5, 5a respectively, having a pair of second terminals 6, 6a which are connected to the pairs of indicator lights 7, 7a respectively, at the appropriate side of the vehicle. Within the flasher units respectively are a pair of electro-magnets the coils 8, 8a of which are connected, at one end, to the second terminals 6, 6a respectively and at their other ends to the first terminals 4, 4a respectively through a pair of resistance wires 9, 9a.

Also provided within the flasher units respectively are a first pair of normally open contact sets 10, 10a and the moving contacts of each set are supported on armatures, respectively operable by the coils 8, 8a. Moreover, a portion of the wire constituting the resistance wires 9, 9a is used to hold the contacts in the open position against the pull of the electro-magnets. The sets 10, 10a of contacts, when closed, serve to bridge the resistance wires 9, 9a respectively. Furthermore a second pair of normally open contact sets 11, 11a are provided and these are operable by further armatures mounted so as to be influenced by the electro-magnet. The further armatures are spring loaded towards a position in which their associated sets of contacts are open and the latter when closed connects the terminals 4, 4a with a third pair of terminals 12, 12a the latter being connected to each other and to a pilot lamp 13, mounted so as to be visible by the operator of the vehicle. It will be appreciated that the other connections to the various lamps are completed through the frame of the vehicle and that the source of supply is likewise connected to the vehicle frame.

The arrangement is such that when the switch is moved to one of its operative positions say for example to the position in which the wiper 1 contacts the terminal 3, the resistance wire 9 in the flasher unit 5 will be heated, owing to current flowing therethrough to the indicator lights 7. When the resistance wire has been heated for a prearranged time it will expand sufficiently to allow the pull imparted by the electro-magnet on the armature to move the armature to close the set of contacts 10. Upon closure of the set of contacts the indicator lamps 7 will be fully illuminated owing to the fact that the resistance wire 9 is now shorted out. The increased current flowing through the coil 8 will cause the further armature to be moved to close the set of contacts 11 and the pilot lamp 13 will be illuminated to indicate the correct functioning of the system. As is well known with this type of flasher unit the springs of the further armatures are so adjusted that if one of the indicator lights fails, even though the other indicator lamp will still operate the pilot lamp will not be illuminated and will therefore indicate a fault in the system.

There is also provided a pair of current sensitive relays 14, 14a having one end of the coils 15, 15a thereof connected respectively to the junctions of the resistance wires and the coils of the flasher units 5, 5a respectively. The other ends of the relay coils are connected, to a pair of lamps 16, 16a respectively mounted on opposite sides of a trailer which it is intended to tow with the vehicle. Moreover the relays incorporate two sets of contacts 17, 17a respectively one of each set of contacts being connected to said one end of the relay coils 15, 15a respectively, and the other of each set of contacts being connected together and to a second pilot lamp 18 also mounted in a position to be seen by the operator of the vehicle. The arrangement is such that when the switch is operated as described the first part of the circuit will operate as described and the appropriate trailer lamp will be illuminated by the passage of current through the coil of the appropriate relay. Furthermore the contacts of said relay will close owing to the passage of current through the coil and the pilot lamp 18 will be illuminated. In the event of failure of an indicator lamp on the trailer, or an open circuit then the second pilot lamp will not operate. In order to facilitate the connection of the indicator lamps 16, 16a of the trailer vehicle severable connectors 19, 19a are provided. Moreover the flasher units and current relays are mounted together and a plug connector, indicated at 20, is provided to enable connection to be made with the indicator lamp, pilot lamps and selector switch.

By an arrangement as described there is provided a convenient method of extending the direction indicator circuits of a vehicle so that direction indicator lights can be provided on a trailer to be towed by the vehicle.

Having thus described by invention what I claim as new and desire to secure by Letters Patent is:

1. A vehicle direction indicator system of the flashing electric indicator lamp type and comprising a flasher unit having a first terminal for connection to a source of electric supply, a second terminal, a set of indicator lamps on the vehicle for connection to said second terminal, an electromagnet the coil of which is connected between said first and second terminals, one end of the coil being connected to the second terminal, a resistance wire connected in series with the other end of the coil and said first terminal, a first armature operable by the electromagnet to close a first pair of contacts, a portion of said resistance wire acting to restrain the movement of the first armature by the electromagnet, said first pair of contacts being arranged to bridge the resistance wire to allow full current flow to the indicator lamps, a third terminal, a pilot lamp connected to said third terminal, a second armature operable by the electromagnet when the current flowing through the coil thereof attains a predetermined value, a second pair of contacts operable by said second armature and arranged when closed, to complete a circuit between said first and third terminals to cause illumination of the pilot lamp, characterised by the provision of a fourth terminal connected to a point intermediate the resistance wire and the coil whereby any current flow to the fourth terminal will not substantially effect the frequency of operation of the flasher unit, a current relay connected to said fourth terminal, a second set of indicator lamps optionally connectible to said fourth terminal by way of said current relay, and a second pilot lamp operable by said current relay to provide an indication of the operation of the second set of lamps.

References Cited

UNITED STATES PATENTS

| | | | |
|---|---|---|---|
| 2,282,956 | 5/1942 | Falge et al. | 340—251 |
| 2,743,431 | 4/1956 | Wright | 340—251 |
| 2,803,811 | 8/1957 | Turney | 340—80 |
| 3,206,723 | 9/1965 | Doane | 340—81 X |
| 3,302,173 | 1/1967 | Konz et al. | 340—81 |

FOREIGN PATENTS

| | | |
|---|---|---|
| 924,128 | 2/1955 | Germany. |
| 831,510 | 3/1960 | Great Britain. |
| 864,498 | 4/1961 | Great Britain. |

JOHN W. CALDWELL, Primary Examiner

K. N. LEIMER, Assistant Examiner

U.S. Cl. X.R.

340—251